United States Patent [19]

Scarpino

[11] 3,891,894
[45] June 24, 1975

[54] MEANS FOR MONITORING THE SAFETY OF A REMOTE ELECTRICAL GROUND CONNECTION

[75] Inventor: Leopoldo Scarpino, Indianapolis, Ind.

[73] Assignee: Amax Inc., New York, N.Y.

[22] Filed: July 16, 1973

[21] Appl. No.: 379,243

Related U.S. Application Data

[63] Continuation-in-part of Ser. No. 358,468, May 9, 1973.

[52] U.S. Cl. .............. 317/18 C; 317/18 D; 317/45
[51] Int. Cl. .............................................. H02h 3/16
[58] Field of Search ........ 317/18 R, 18 C, 18 A, 45; 324/51, 62, 64, DIG. 1

[56] References Cited
UNITED STATES PATENTS 3,728,582   4/1973   Agnew .................... 317/18 C
3,746,929   7/1973   Kotheimer ................ 317/18 A Primary Examiner—J. D. Miller
Assistant Examiner—Patrick R. Salce
Attorney, Agent, or Firm—Kasper T. Serijan; Roy C. Hopgood

[57] ABSTRACT

The invention contemplates safety monitoring of the condition of a remote electrical ground with reference to a given base end, as in application to elongate flexible trailing cable of the character used to supply large quantities of electrical power from a base or source-connection end to a movable load-connection end, which may be as much as several miles remote from the base end. Aside from power conductors, the trailing cable may have a ground conductor and one or more pilot conductors, providing a fail-safe circuit through pilot and ground conductors, whereby power is automatically disconnected at the source-connection end, should there be an interruption in the fail-safe circuit. The invention provides additional circuit elements utilizing the existing ground conductor and other of said conductors for monitoring the true instantaneous resistance between the source-connection and load-connection ends of the ground conductor and, in a preferred form, for automatically interrupting the fail-safe circuit when the monitored ground-conductor resistance is found to reach a predetermined unsafe level, as for example 4 ohms or less.

30 Claims, 6 Drawing Figures

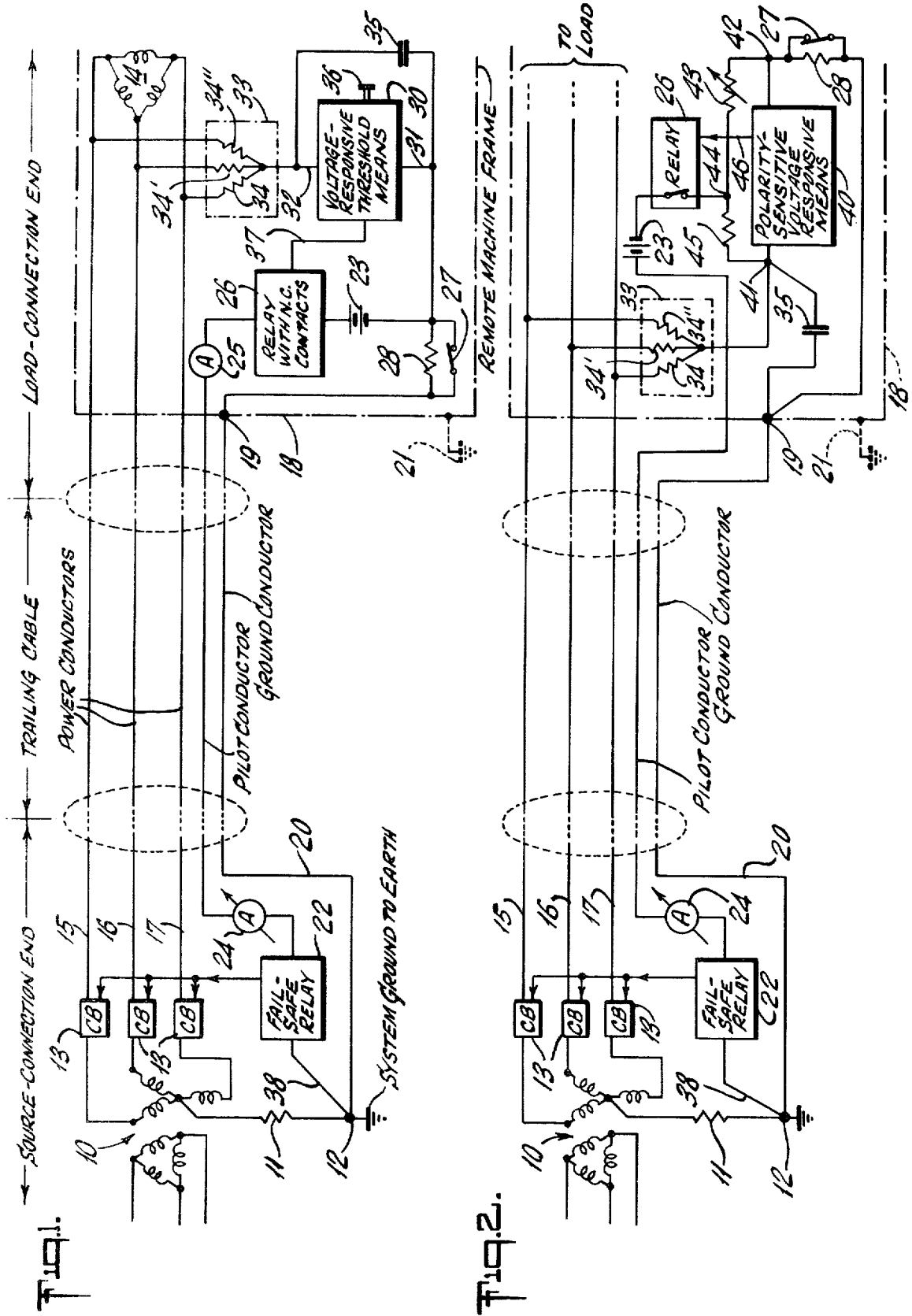

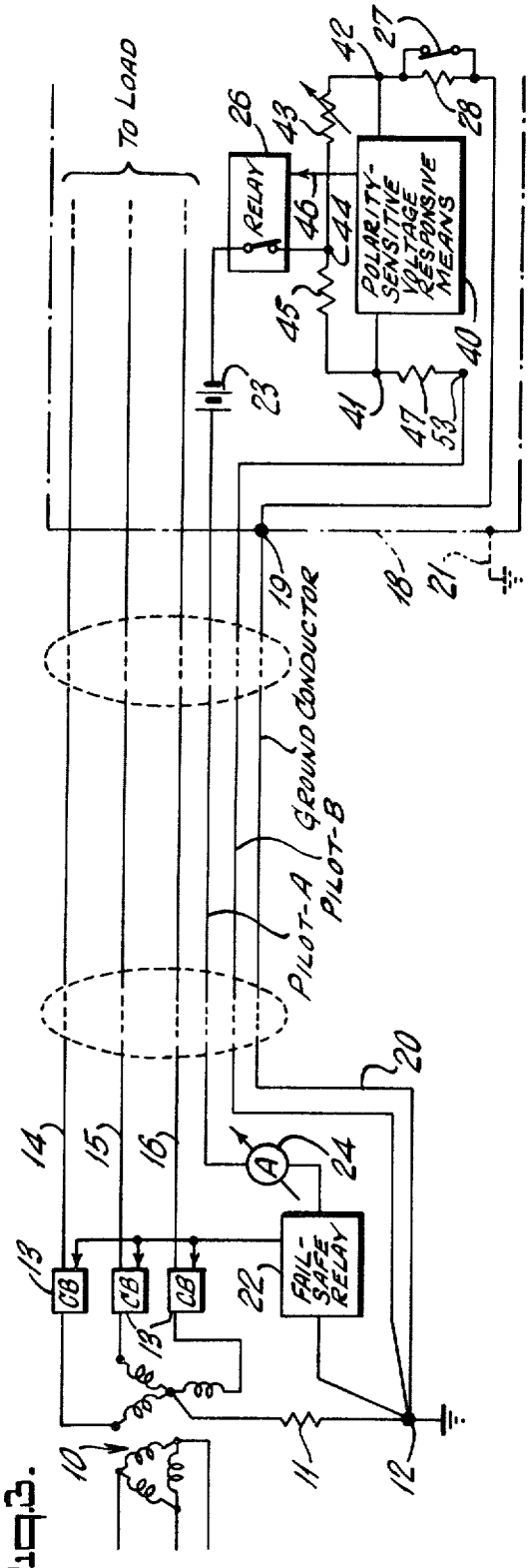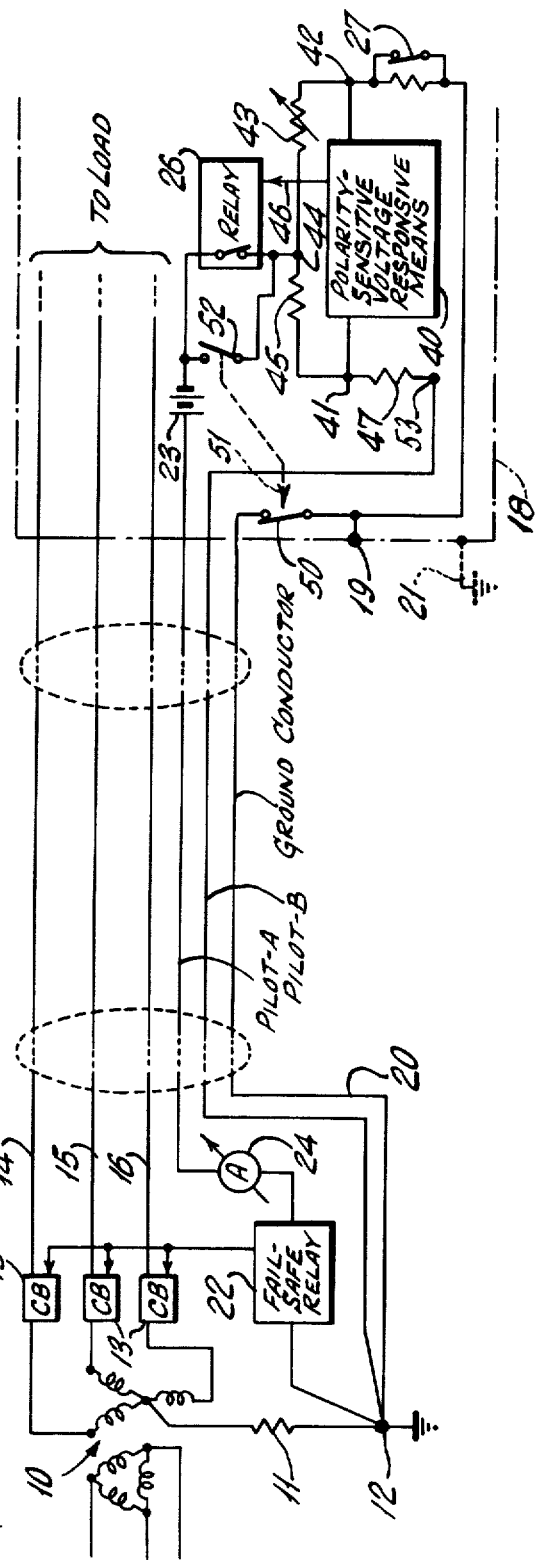

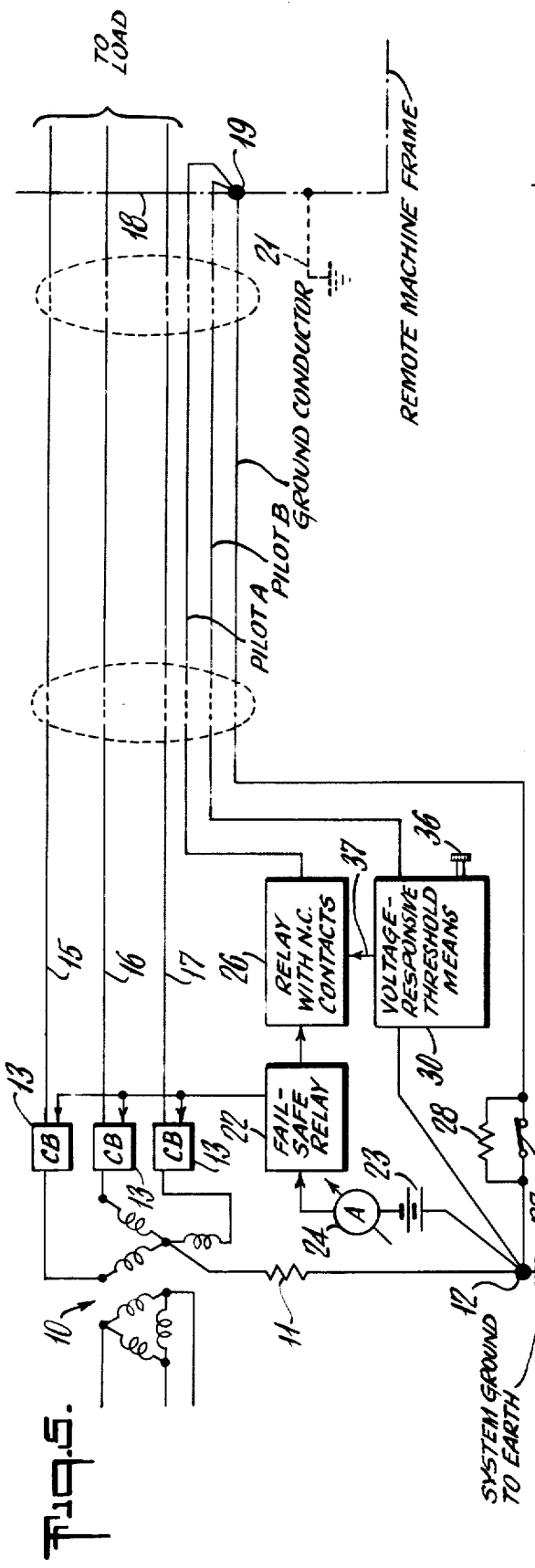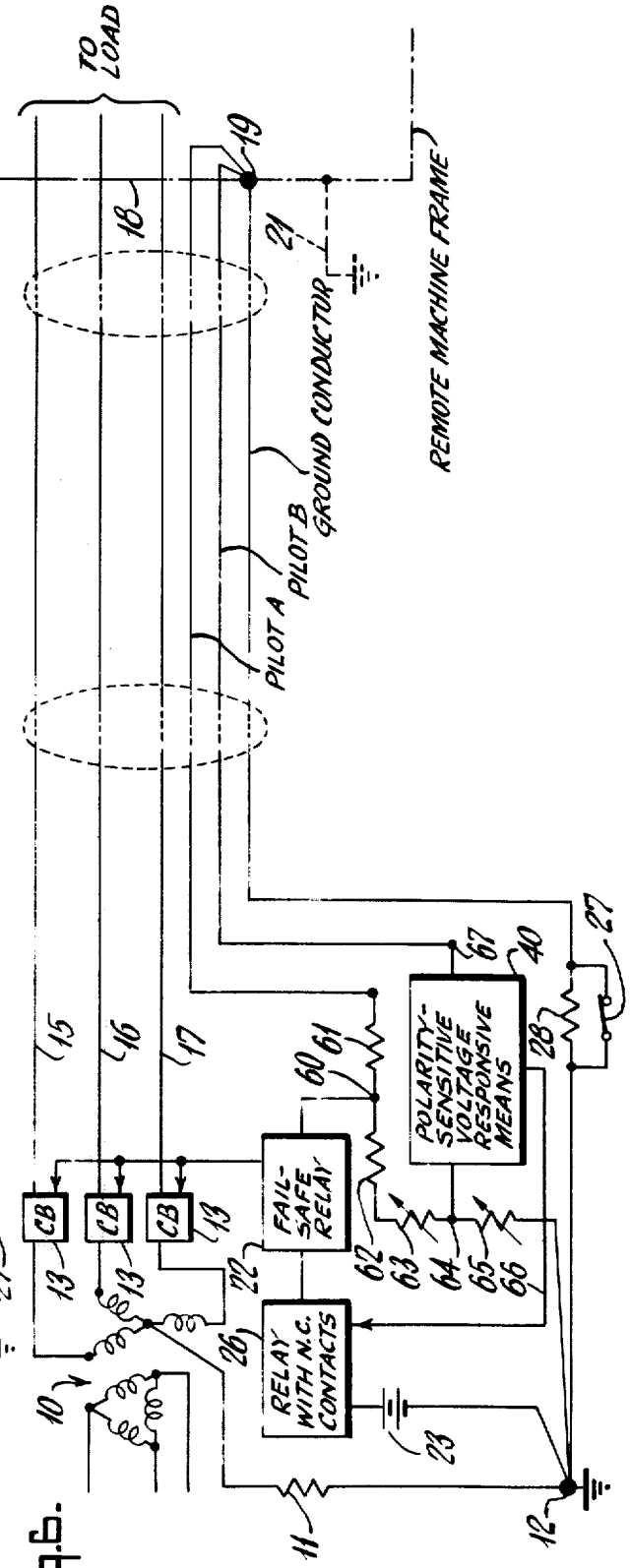

MEANS FOR MONITORING THE SAFETY OF A REMOTE ELECTRICAL GROUND CONNECTION

The present application is a continuation-in-part of my copending application Ser. No. 358,468, filed May 9, 1973.

This invention relates to safety circitry for use with trailing cables or the like wherein there must be assrance that remote apparatus cannot develop lethal electrical ground potentials with respect to earth potential.

In the supply of electrical power to heavy and distant moving industrial machines such as strip-mining shovels, a single multiple-conductor trailing cable provides flexible connection of the remote machine to its base or source-connection end. Very often a major source connection will supply a plurality of trailing cables, serving different-size loads at a variety of remote and maving destinations, and using a variety of power-conductor voltages as appropriate for each load and its distance from the base; in other situations, extensions, tapping or branch trailing-cable connections of various capacities are made to a single major trailing cable, at locations along the length of the major cable, and with extension or branch-cable capacities and lengths appropriate to the several different loads served thereby. In general, it can be said that whatever the capacity of a major or branch cable, it has (a) its own source-connection end at which circuit breakers serve exclusively to protect electric power supplied to the particular cable (neutral-to-ground resistance being selected for an ohmic value which will limit current flow due to a power fault to ground so as not to exceed 25 amperes), (b) a load-connection end, which may be a traveling machine, or a step-down transformer for supply of one of more further branch cables, (c) a ground conductor which is relied upon to maintain a prescribed degree of electric integrity of all cable and load grounds with respect to ground potential at the source-connection end, and (d) a pilot conductor which is relied upon to maintain current in a fail-safe circuit through the associated ground conductor, so that the applicable circuit breakers will trip in the event of current failure in the fail-safe circuit, (e) the power conductors, ground conductor and pilot conductor all forming mutually insulated elements of the particular trailing cable. As used in this specification, the expression "trailing cable" will be understood to apply to a given length, served from a source-connection end, and serving a load-connection end, via multiple-conductor flexible cable, such as that just described, regardless of whether the particular length is a major cable (e.g., three-phase power distribution at 15 kilovolts) or a branch cable (e.g., at 6,900 or 440 volts).

The schemes which have to date been devised to assure against development of excessive ground potentials (to earth) in trailing-cable systems of the character indicated are many and are in general not practical. For example, a "series-connected" variety uses a d-c source at the source-connection end of the pilot-line arm of te fail-safe circuit, the latter being completed by connection of the ends of said arm to the corresponding ends of the ground conductor. In such a system, the fail-safe relay at the source-connection end of the pilot line is set to drop out (i.e., to trip the associated breakers) at a preselected minimum level of fail-safe current, on the assumption that such level is indicative of excessive resistance in the ground conductor; the difficulty with such a system is that it does not and cannot assuredly operate on the resistance of the ground wire, due to its vulnerability to resistance-reducing effects of shunt paths. Also, a "shunt-connected" variety places the coil of the fail-safe relay in shunt across the d-c source and a suitable resistor, to monitor for current build-up beyond a predetermined level, as in the case of a breakage in the ground conductor. Neither of these kinds of solution is adequate to the task of always tripping the breakers should the ground wire itself increase in resistance above a predetermined level, short of the minimum earth resistance between the source-connection and load-connection ends of the cable.

It is, accordingly, an object of the invention to provide an improved safety mechanism of the character indicated.

Another object is to provide such an improved mechanism without requiring any change in cable construction.

A specific object is to provide such an improved mechanism which is sensitive essentially only to ground-conductor resistance, and at a predetermined level less than the minimum local earth resistance and greater than the "good-condition" or "equal-to-new" resistance of the ground conductor.

Another specific object is to provide such an improved mechanism which will assuredly operate to trip the associated breakers when detected ground-conductor resistance is at least no greater than 4 ohms.

A further specific object is to provide such a system wherein that resistance value can be selected, upon the detection of which value as the resistance of the ground conductor, the associated breakers will automatically shut down the supply of power to the trailing cable.

A general object is to achieve the foregoing objects with basically simple and reliable circuitry, requiring little or no adjustment, monitoring or maintenance; mechanism that is relatively fool-proof and involves the use of available, non-critical components, and which at the same time lends itself to the protection of a variety of different sizes, lengths and capacities of trailing cable.

Other objects and various further features of novelty and invention will be pointed out or will occur to those skilled in the art from a reading of the following specification, in conjunction with the accompanying drawings. In said drawings, which show illustrative preferred forms of the invention:

FIG. 1 is a diagram schematically showing one embodiment of the invention, in application to a trailing cable and its power-supply and load connections; and FIGS. 2 to 6 are simplified similar diagrams to show further embodiments.

The system of FIG. 1 is seen to employ a five-conductor trailing cable which will be understood to extend flexibly between a source-connection end and a load-connection end, all as generally indicated by legend in the drawing. The system is illustrative of the principle of resistance-monitoring in the ground conductor, utilizing constant current in a series-connected fail-safe circuit which includes the ground conductor, and observing voltage drop between ends of the ground conductor.

Specifically, the ground-connection end is shown to include a three-phase power-source connection comprising a transformer 10 having Δ-connected primary windings and Y-connected secondary windings, the secondary "neutral" or "center" having a grounding resistance 11 in its connection to the point 12 of system-grounding to earth. Three-phase power is supplied through line circuit breakers 13 to a delta-connected load 14, via three power conductors 15-16-17. The trailing-cable length between the source-connection and load-connection ends will be understood to be flexible, adapted to lie on the surface of the terrain, and to extend various distances, for example up to five or more miles, the conductor size and transmission voltage being as appropriate for the load and distance requirements imposed on the cable shown. The load-connction end will be understood to comprise a metal housing or machine frame 18, indicated by dashed outline and having a terminal 19 by which the ground conductor 20 of the cable is directly clamped to the system-ground terminal 12; the indeterminate relation of the load-frame ground to local-earth ground is suggested by dashed-line symbolism at 21. The circuit of a series-connected fail-safe relay 22 is shown to include ground conductor 20 and a pilot-arm. The pilot arm is connected to ground conductor 20 at the system-ground teminal 12 and additionally includes the coil of relay 22, a d-c source 23, means 24 for the regulation of d-c current to a predetermined level (as suggested by an arrow symbol), a local ammeter 25, a relay 26 with normally closed contacts which are openable to interrupt current flow in the fail-safe circuit, and local test elements comprising normally closed contacts 27 bridging a test resistor 28. The completed circuit through the thus-far described parts bears a funcitonal resemblance to series-connected systems of the prior art.

In accordance with the invention, means are provided at one or both of the connection ends of the trailing cable whereby ground-conductor resistance is monitored by a direct measurement between the ground-connection terminals, i.e., with substantially the same effectiveness as if one could take a familiar volt-ohm meter and apply its respective leads to terminals 12-19, in spite of the great physical distance between these terminals.

In the form of FIG. 1, wherein the regulating means 24 (which may be a variable resistor of ohmic value substantially exceeding the ohmic resistance of the ground wire) serves to maintain substantially constant current in the fail-safe circuit; therefore, voltage measured between terminals 12-19 is directly indicative of ground-conductor resistance. Such a voltage-responseive means is schematically indicated at 30, at the load-connection end; as shown, one of the voltage-sensing "leads" 31 of means 30 is connected to the machine frame, i.e., terminal 19, and the other lead 32 makes use of the d-c capabilities of neutral-connections to the respective ends of the power conductors 15-16-17, without in any way impairing or being adversely affected by the relatively great quantities of three-phase power being delivered to and consumed by load 14. If the load 14 were Y-connected, direct connection of the voltage-sensing lead 32 could be made thereto, preferably through a suitably large protective grounding resistor; but in view of the delta-connection of the load 14, I employ a network 33 of like resistors 34-34'-34'' connected to the respective power conductors, and establishing a local neutral at their common connection to lead 32. Also, preferably a by-pass capacitor 35 bridges the voltage-responsive means 30, to assure a-c elimination from the desired d-c voltage response. Thus, whether the load is delta or Y-connected, lead 32 has a local d-c or neutral connection to the power conductors, and all three power conductors 15-16-17 provide the means of effectively extending lead 32 to the system-ground terminal 12.

Voltage-responsive means 30 will be understood to be of the very high impedance variety, such as a vacuum-tube voltmeter, so that it does not rely upon drawing d-c or other current via the lengthy lead connection to terminal 12. Also, as a straight voltmeter, the means 30 will be further understood, with a scale calibrated in ohms, to be directly and correctly readable in terms of true resistance between terminals 12-19.

Still further symbolism appears in the drawing, to illustrate automatic functioning of the described circuit. The voltage-responsive means 30 is indicated by legend to include a threshold-operating feature, whereby upon response to a detected d-c voltage of magnituce predetermined as by manual selection and adjustment at a knob 36, an output signal is produced in a control connection 37 to the coil of relay 26, such output signal being operative to open the normally closed contacts of relay 26 and thus to interrupt the normal flow of current in the fail-safe circuit. Such interruption will be recognized at relay 22, since its picked-up condition can no longer be maintained, and all circuit breakers will trip, to de-energize the power conductors and the load.

The drawing also shows, at 27-28, means for testing the operablity of the automatic circuitry which has been described. Normally, the closed contacts 27 will enable the voltage-responsive means 30 to make a true resistance measurment of ground conductor 20. However, to make sure that the automatic circuitry is correctly operative, a push button need only be pressed to open contacts 27, thus causing means 30 to additionally sense the voltage drop across resistor 28, it being understood that resistor 28 is selected of such magnitude, for the constant current regulated at 24, to assure appearance of an seemingly "dangerous" ground-conductor resistance, e.g., 4 ohms or more. In the circumstances, means 30 has no choice but to produce the relay-operating output in line 37, whereby breaker 13 are caused to trip as part of a test procedure. It will also be understood that the test elements 27-28 can be anywhere in series with the ground conductor and in the fail-safe circuit, as for example at the source-connection end of the system, as long as the test elements 27-28 are embraced by the voltage response of means 30.

In noraml operation, d-c current flows continuously in the fail-safe circuit comprising the pilot and ground conductors, and the closed contacts at 26-27, thus maintaining a hold-in supply of current to the coil of fail-safe relay 22, so that breakers 13 continuously enable full power to pass to the load 14. In such normal operation, the d-c current remains substantially constant, so that voltage drop between terminals 12-19 is a true indication of ground-conductor resistance, under the constant surveilance of the voltage-responsive threshold means 30. Periodically, operation can be checked out by opening the test contacts 27, causing threshold detection at 30, with resultant opening of relay contacts at 26, drop-out of the fail-safe relay, and tripping of breakers 13. The same result will also ensue if means 30 should detect the threshold without operation of test contacts 27, meaning of course that the detected increase in ground conductor resistance is a true cause for automatic alarm, here noted by trip of the breakers 13.

Stated in more practical illustrative terms, for grounding resistor 11 selected to limit a ground-to-power conductor fault to 25 amperes, and for a 0.5-ampere fail-safe current selected at 24, and for means 36 set to trip at 2 volts (meaning a limiting ground-conductor resistance of 4 ohms), no short circuit, as from a power conductor to the ground conductor, can ever develop a ground-conductor voltage greater than 100 volts (25 amperes, times 4 ohms); thus the greatest personnel exposure to a ground-conductor voltage will be held to a short transient of no more than 100 volts. It will be understood that, with changed settings, the described system has the inherent capacity to protect as to an even lower limiting condition, the presently illustrative values being supplied merely because they realize the currently stated Bureau of Mines safety objective, which to my knowledge has not hitherto been reliably realized by any other ground-protection system.

The circuitry arrangement of FIG. 2 bears certain resemblance to that of FIG. 1 and, therefore, corresponding reference numerals are used where appropriate. The principal difference resides in the technique for monitoring the ground conductor terminals 12–19 as to a predetermined resistance threshold.

In FIG. 2, polarity-sensitive voltage-responsive means 40 is employed to monitor voltage across opposed terminal corners 41–42 of a Wheatstone bridge, wherein the ground conductor 20 is connected at 42 to a variable resistor 43 to define one of two conjugate arms between opposed bridge-excitation terminal corners 44–12. The other conjugate arm between the excitation terminal corners 44–12 comprises the ground resistor 11 plus the effective resistance of network 33, all as connected at 41 to a further resistor 45. Voltage excitation for bridge terminals 44–12 may be developed from a d-c source 23 at the source-connection end of the pilot arm to terminal 44; however, in the preferred form shown, source 23 is at the load-connection end of the pilot arm. Thus, fail-safe relay 22 is normally "held-in" through flow of continuous current in the fail-safe circuit, from source 23 to terminal 44, resistor 43, testing contacts 27, terminal 19, and back via ground conductor 20 to the system ground 12 and its connection 38 to source 23.

Preferably, resistor 45 is selected for a resistance value which substantially matches the resistance between points 41–12, namely the combined effective resistance of network 33 and grounding resistor 11. Thus, if resistors 34-34'-34" are in the order of 10 megohms and resistor 11 is negligible by comparison, the effective resistance between points 12 and 41 will be substantially 3.3 megohms, and resistor 45 is preferably selected at 3.3 megohms. The balanced condition of the bridge will therefore exist when the ground-conductor resistance (terminal 12 to terminal 19–42) equals the value set at resistor 43, and this value at 43 should be set to match the desired limiting resistance in the ground conductor 20 (e.g., 4 ohms to meet Bureau of Mines requirements, or preferably something less, such as 3 ohms, to exceed the Bureau of Mines requirement). Thus, in a normal operating situation wherein the actual ground-conductor resistance is in the order of 1 or 2 ohms, or is otherwise less than the limiting magnitude preselected at 43, the polarity-sensitive voltage-responsive means 40 will indicate or otherwise function in accordance with a first polarity status, for the d-c potential of terminal 42 with respect to terminal 41; however, should the ground-conductor resistance sufficiently increase (for example, through the resistance-degrading effect of having run bulldozer cleats over the trailing cable) to equal or exceed the resistance threshold preselected at 43, the bridge will pass through a balanced condition, with reversal of the polarity of the potential across terminals 41–42. The means 40 will be understood to produce a resulting output in line 46 to relay 26, causing an opening of the contacts of relay 26 upon such polarity reversal, and as previously indicated, such an opening in the pilot arm of the fail-safe circuit will produce drop-out of the relay 22 and a trip of the breakers 13.

Also as previously described, and for a proper selection of test resistance at 28, a test opening of contacts 27 will create for means 40 the appearance of a dangerous resistance development in conductor 20, causing relays 26–22 to perform a power shutdown in the power conductors 14-15-16.

The embodiment of FIG. 3 illustrates another Wheatstone-bridge arrangement, wherein previously described corresponding parts are given the same reference numerals. The difference for the case of FIG. 3, is that the trailing cable has two pilot conductors, labeled Pilot A and Pilot B, respectively, and no use of the power conductors 14-15-16 is made for operation of the bridge.

In FIG. 3, the conjugate arm comprising ground conductor 20 and variable resistor 43 (interconnected at 42) may be as described for FIG. 2. However, the other conjugate arm comprises an additional resistor 47 and the Pilot-B conductor, connected at 41 to resistor 45. Bridge excitation from source 23 is applied to terminals 12–44, and resistors 45–47 are preferably selected to be substantially matched and of relatively large value, so that the fail-safe current will still circulate primarily by way of the ground conductor 20 and the Pilot-A arm, which includes relay 22, the normally closed contacts of relay 26, and the normally closed testing contacts 27. Operation is as described for FIG. 2.

Although FIG. 4 is virtually identical to FIG. 3, it will be recognized as illustrating a principal that is applicable to all other disclosed forms of the invention.

In FIG. 4, the load-connection end of the ground conductor is brought to the local machine-ground terminal 19 by way of normally closed contacts 50, which may be push-button operated, as suggested at 51. Thus, a test procedure involving opening of contacts 50 will present the voltage-responsive means 40 with a resistance which represents the instantaneous true earth resistance (via 21) and all possible paths to the system ground 12; preferably, relay 26 is temporarily disabled during the measurement so as to avoid unwitting shutdown of power in conductors 14-15-16, and I provide normally open contacts 52 across the normally closed contacts of relay 26, contacts 52 being interlocked with contacts 50 (as suggested by dashed-line mechanical interconnection) to assure closure at 52 whenever contacts 50 are pressed open for an earth-ground resistance measurement. When contacts 50 are thus actuated, resistor 43 may be adjusted to achieve bridge balance (zero-indicated volts at 40), whereupon an indicating scale for the adjustment at 43 will be direct reading for the then-existing effective earth-ground resistance between the source-connection and load-connection ends of the system.

FIGS. 5 and 6 provide specific illustration of applications in which ground-conductor resistance is monitored from the source-connection end of trailing-cable systems, rather than from the load-connection end. The principles of these circuits are applicable to single pilot-wire cables, as in FIGS. 1 and 2 wherein power conductors serve a pilot-wire function, but the circuits of FIGS. 5 and 6 are shown in use with cable having two pilot wires (Pilot-A and Pilot-B) as in FIGS. 3 and 4.

Aside from the above-noted differences, the circuit of FIG. 5 will be recognized as being of the FIG. 1 principle, wherein ground-conductor current develops a voltage across the ground conductor, monitored by threshold means 30 across points 12-19 and using the Pilot-B conductor; at the load-connection end, both the Pilot-A and Pilot-B conductors are connected to the ground conductor at the point 19 of its connection to the remote machine frame. The circuit of the fail-safe relay utilizes the Pilot-A conductor and includes source 23, current-control means 24 and the normally closed contact function of relay 26, all at the source-connection end of the system. Means 24 is adjusted to a desired level of current flow (e.g., 1 ampere) in the circuit of the Pilot-A and ground conductors, it being noted that means 30 having to do with voltage measurement is of such relatively high resistance as to allow virtually no current flow in the Pilot-B conductor; voltage response at 30 is thus tantamount to response to instantaneous resistance in the ground conductor. As long as this observed resistance is less than the threshold level preset by means 36, and as long as current is able to flow in the fail-safe circuit, the fail-safe relay will stay energized, to maintain the closed condition of the line breakers 13. However, once the threshold is reached, an output in connection 37 to relay 26 is operative to break the pilot arm of the fail-safe circuit, thus dropping out relay 22 and the line breakers 13. System test, by manual opening of contact 27 at the system-ground end of the ground conductor, will momentarily inject sufficient resistance 28 into the ground conductor, to produce the same tripping of relay 22 and breakers 13, as will be understood.

The circuit of FIG. 6 represents illustration of the use of Wheatstone-bridge components at the source-connection end of the system wherein the bridge is severed to utilize the Pilot-B conductor in the voltage-response diagonal of the bridge rather than in the source-excitation diagonal of the bridge (as in FIG. 3). The source-excitation diagonal is between system ground and a bridge corner 60, the excitation circuit comprising source 23, the normally closed contacts of relay 26 and the fail-safe relay 22. From corner 60, the bridge divides into two matched high-resistance arms, namely, a first arm containing a relatively high resistance 61 (e.g., 1,000 ohms) and the Pilot-A conductor to the remote-machine ground (frame) connection 19, and a second containing a relatively high resistance 62 (e.g., 1,000 ohms) and a variable resistor 63 to a bridge corner 64, resistor 63 being so adjusted as to enable close match of the combined value of resistors 62-63 to the combined value of resistor 61 and the Pilot-A conductor. The voltage-measuring corners are at 19 and 64, the Pilot-B conductor being used to enable polarity-sensitive voltage-responsive means 40 to respond across this diagonal. One of the remaining arms is the ground conductor itself, between corners 19 and 12, and the final arm comprises a variable resistor 65 between corners 64 and 12, the value of resistance at 64 being set to the maximum resistance level to be tolerated in the ground conductor.

In normal operation, continuous current flow from source 23 divides substantially equally through the path 60-64-12 and through the path 60-19-12, the current being adequate to excite the fail-safe relay 22 and thus to hold the closed condition of line breakers 13. As long as means 40 detects no change in voltage polarity, the preset resistance value at 65 exceeds ground-conductor resistance, and the circuit permits safe delivery of power to the remote machine via power conductors 15-16-17. Any increase in ground-conductor resistance beyond the value preset at 65 causes sensed polarity to change at 40, causing a control output in line 66 to trip relay 26 and thus drop out relay 22 and the line breakers 13.

The described embodiments of the invention will be seen to have achieved all stated objects with structure of elemental simplicity and using non-critical components. In particular, the invention is realizable with minimum modification of existing trailing-cable installations in the field, and in all cases it is possible not only to monitor for the onset of a predetermined "unsafe" level of ground-conductor resistance, but also to test the monitoring efficiency as well as to actually measure the then-existing earth-ground resistance back to the system ground 12.

According to current Bureau of Mines requirements, a grounding resistor such as the resistor 11 for the supply-line neutral at the source-connection end must be of such ohmic value as to limit the voltage drop in the grounding circuit external to the resistor to no more than 100 volts under fault conditions and also to be such as to limit the ground fault current to no more than 25 amperes, thus establishing the above-noted 4-ohm limitation for ground-conductor resistance. It is believed that the present invention for the first time provides a means whereby this important ohmic value can be continuously monitored. And such monitoring is achieved while also meeting Bureau of Mines requirements as to operation of the fail-safe ground-check circuit, meaning that the breakers 13 will be tripped if either the pilot conductor or the ground conductor should open (i.e., break). Moreover, the nature and connection of the threshold responsive means (30, 40) are such as to be inherently relatively "blind" or insensititve to unbalanced load transients that may be induced in any part of the fail-safe circuit, so that the invention is operative where other system cannot be relied upon, and using cable of virtually any sectional geometry, including asymmetrical cable sections.

The invention provides still further desirable features; in that:

a. The invention is operative with any length of cable, with only minor adjustment;

b. As long as the source 23 of fail-safe circuit current is at the remote end of the system, the breakers 13 will trip in the event of a short between pilot and ground conductors;

c. The invention does not require insulating the ground conductor or "lifting" it at any point;

d. The invention does not require use of a "shunt" or "shunts" in the ground or fail-safe circuit;

e. The invention will correctly respond to sense an open ground conductor, even though the cable or cables may be earth-grounded at several points;

f. The invention operates so to detect resistance and to assure shutdown of power that there will be no hazzard in personnel contact with an unsuspected open ground;

g. The sytem is such as inherently not to require any resetting once it has tripped the circuit breakers, i.e., upon closing the circuit breakers, any subsequent trip action will be the result of a new threshold evaluation, to actuate relay 26;

h. The basic or modular-unit nature of the invention means that it is compatible with itself in any combination of major and subordinate trailing cables, breakers, couplings, Y- or Δ-winding configurations, etc.;

i. The invention does not require frequent resetting of thresholds or critical adjustments, once installed; in fact, adjustments made in the shop, factory or otherwise prior to installation may in most cases be correct, without compromise of safety;

j. The bridge-connected threshold systems of FIGS. 2 to 4 are non-critical as to voltage or current in the fail-safe circuit, in that they all operate on a comparison between voltages at terminals 41–42, the excitation voltage being proportionally divided in like fashion along each of the respective conjugate arms of the bridge; and k. Ground-conductor resistance may be so accurately monitored at a threshold level less than the lowest possible earth resistance that breaker trip through the invention provides a positive indication of trouble in the pilot conductor or in the ground conductor.

While the invention has been described in detail for the preferred forms shown, it will be understood that modifications may be made without departure from the scope of the invention. For example, the invention is not necessarily to be considered limited to three-phase power systems but is applicable whereever the necessary control of ground-conductor resistance is to be monitored, in systems which may be other than employed for power distribution, or in which other than three-phase power is delivered.

Also, for example, FIGS. 3 and 4 will be understood to schematically indicate elements of a separate article of manufacture for application to the remote end of an existing multiple-conductor cable system having a system ground 12 at the source-connection end. Such article may comprise the indicated interconnected components of virtually the entire Wheatstone bridge. Thus, such a package may contain the interconnected resistors 45-47-43 ad voltage-responsive means 40, in which case the package presents three terminals for external connection in the field, there being included in such package a display of voltage detected by means 40 and a manual adjustment, preferably calibrated in ohms, for the variable resistor 43; the three terminals in such case are (1) a first bridge-excitation terminal, for field connection to the conductor arm (Pilot A) which serially contains the bridge-excitation voltage source, (2) the terminal 53 by which the serially connected fixed resistors 45–47 complete one of the conjugate bridge arms upon series-connection in the field to the adjacent end of an independent d-c conducting path to the other bridge-excitation terminal (12), and (3) the terminal 42 by which the variable resistor 43 is serially connected in the field to the load-connection end of the ground circuit to be evaluated by the bridge.

Still further by way of example, FIGS. 3 and 4 will be understood to schematically indicate elements of a further article of manufacture for field-testing of the fidelity of earth ground in a given system ground that is suspected of being less than adequately earth-bound. Such an article will be understood to comprise the elements of the package of the preceding paragraph, and to further include:

a. Elongate flexible conductors (Pilot A and Pilot B), connected to each other at one end (12), wherein the heavy dot at 12 will be understood to suggest means, such as an aligator clip, for removable connection to a system ground to be tested, one of these conductors (Pilot A) serially including a voltage source (23) and therefore comprising the means of excitation across bridge terminals 12–44, the other of these conductors (Pilot B) constituting with the resistors 45–47 a first conjugate arm of the bridge; and b. Means symbolized at 19 (or at 42) and comprising for example an aligator clip for removable connection of means 40–43 to another earth-bound system ground, such as a rail of railroad track, the cold-water supply plumbing of a building, etc., thereby completing the other conjugate-arm connections through resistor 43 and the two system grounds and the earth therebetween.

In use of such an article, the adjustment at 43 to the point of bridge balance will provide a direct reading of true resistance between the two system grounds and if the ohmic reading is not as low as that to be expected for local earth resistance, it can be known that the suspected system ground is not to be trusted unless and until proper corrective measures have been taken.

Analogy to the foregoing example of the field-testing article of manufacture (FIGS. 3 and 4) will be seen for the bridge-operated system illustrated in FIG. 6. Such a FIG. 6 article of manufacture will be understood to comprise a package containing components of virtually the entire Wheatstone bridge. Thus, such a package may contain the interconnected resistors 61-62-63-65 and voltage-responsive means 40, in which case the package presents four terminals for external connection in the field, there being included in such package a display of voltage detected by means 40 and a manual adjustment, preferably calibrated in ohms, for the variable resistors 63–65; the four terminals in such case are (1) a first bridge-excitation terminal 67, for field connection to the conductor arm (Pilot B) which serially contains the voltage-responsive means 40, (2) the terminal 68 by which resistor 61 is connected to the Pilot-A conductor, (3, 4) the terminals 12–60 by which the system-ground and voltage-excitation connections are made. And to make such an article specific for field-testing the fidelity of earth ground, the package will be understood to additionally include:

a. Means symbolized by the heavy dot 12 and comprising for example an alligator clip for removable connection of bridge arm 65 and source arm 23 to a first earth-bound system ground, such as a rail of railroad track, etc., thereby completing first conjugate-arm connections through resistors 62-63-65 to ground; and b. Elongate flexible conductors (Pilot A and Pilot B), connected to each other at one end (19), wherein the heavy dot at 19 will be understood to suggest means, such as an alligator clip, for removable connection to the system ground to be tested, one of these conductors (Pilot B) serially including voltage-responsive means and therefore comprising the means of measurement across the terminals 64–19, whereby the other of these conductors (Pilot A) may with resistor 61 complete the other conjugate arm of the bridge, through the two system grounds and the earth therebetween.

What is claimed is:

1. Elongate transmission-line means having a source-connection end and a remote load-connection end and comprising power-conductor means, a ground conductor and at least two pilot conductors; a d-c conducting connection of said two pilot conductors at the source-connection end; a d-c conducting connection of said two pilot conductors at the load-connection end; thereby establishing separate d-c conducting paths through the respective pilot conductors; means for impressing a d-c potential across the full length of said ground conductor, said last-mentioned means including a d-c source in one of said paths and a circuit connection of said one path and said ground conductor at the load-connection ends thereof; and d-c responsive resistance-monitoring means at the load-connection end and including a reference connection to the source-connection end of said ground conductor via the other of said paths, said resistance-monitoring means being also connected to the load-connection end of said ground conductor and thus tracking the instantaneous effective resistance between the source-connection and load-connection ends thereof.

2. Transmission-line means according to claim 1, in which said resistance-monitoring means includes threshold-operative means for responding to a preselected measured-resistance level, said level being preselected to a maximum tolerable level above the known resistance of the ground conductor in good condition.

3. Tranmission-line means according to claim 2, in which said preselected resistance level is selected to be less than the earth resistance between the locations of the source-connection and load-connection ends of said transmission-line means, said earth resistance being taken for the most wet and therefore lowest-resistance condition.

4. Transmission-line means according to claim 2, in which said preselected resistance level is selected to be at least no greater than 4 ohms.

5. Transmission-line means according to claim 2, in which said preselected resistance level is selected to be substantially 3 ohms.

6. Transmission-line means according to claim 2, in which said power-conductor means includes circuit-breaker means at the source-connection end, said circuit breaker means including tripping mechanism connected for response to a predetermined interruption of d-c flow in said one path, said one path including interrupter means connected for response to said threshold-operative means and operative to impress said interruption upon the d-c flow in said one path.

7. Transmission-line means according to claim 6, in which said interruption is at least a transient interruption of the d-c flow in said one path.

8. Transmission-line means according to claim 1, in which said resistance-monitoring means includes connected elements of a bridge circuit having a first excitation terminal at the remote-connection end of said one path and a second excitation terminal at the source-connection end of said one path, a first pair of conjugate fixed-resistance arms between said terminals, said fixed-resistance arms being located at said remote-connection end and including said other path to establish the connection to said second excitation terminal, a second pair of conjugate arms between said terminals, one arm of said second pair being the full length of said ground conductor, and the other arm of said second pair comprising a resistance of value preselected to bear substantially the same relation to the normal good-condition resistance value of said ground conductor that said fixed-resistance arms bear to each other, and means for monitoring voltage observed between the point of connection of the first pair of arms to each other and the point of connection of the second pair of arms to each other.

9. Transmission-line means according to claim 8, in which the resistance values in the respective arms of said first pair are substantially the same, and in which the preselected-resistance arm of said second pair has a vlaue of at least no greater than the desired tolerable safety-limit of resistance of said ground conductor, whereby polarity reversal in monitored voltage will signify said safety-limit of resistance in said ground conductor.

10. Transmission-line means according to claim 9, in which said power-conducting means includes circuit-breaker means at the source-connection end, and said voltage-monitoring means includes polarity-sensitive means operatively linked to actuate said circuit-breaker means upon detection of polarity reversal.

11. Transmission-line means according to claim 10, in which said one path includes a fail-safe hold-in relay to said circuit-breaker means, the said operative link including means for interrupting said one path upon detection of polarity reversal.

12. Transmission-line means according to claim 1, in which said one path includes means for maintaining a substantially constant predetermined d-c current flow in said one path, and in which said moitoring means is voltage-responsive.

13. Transmission-line means according to claim 12, in which said monitoring means includes threshold-operative means for responding to a preselected voltage level, said level being preselected to a maximum which in the context of said regulated current represents the maximum tolerable resistance level above the known resistance of the ground conductor in good condition.

14. Transmission-line means according to claim 3, in which said power-conducting means includes a circuit-breaker means at the voltage-connection end, and in which the connection of said monitoring means to the load-connection end of said ground conductor includes a test resistor of value which when added to the good-condition resistance of said ground conductor establishes an overall resistance exceeding said earth resistance, normally closed switch contacts bridging said test resistor, and an operative trip connection from said threshold-operative means to said circuit-breaker means.

15. Transmission-line means having a source-connection end and a remote load-connection end and comprising multiple power conductors, a ground conductor and at least two pilot conductors; an independent circuit comprising a pilot arm in which a d-c source is series-connected to one of said pilot conductors, one end of said arm being connected to the corresponding end of said ground conductor, and means connecting the other ends of said pilot arm and ground conductor, whereby a d-c current will normally flow in said independent circuit; and means including the other of said pilot conductors for sensing the d-c potential end-to-end across the length of said ground conductor.

16. Transmission-line means according to claim 15, in which the pilot-conductor part of said independent circuit includes means for regulating current to a substantially constant flow, whereby said sensed d-c potential is directly responsive to the instantaneous value of resistance between the source-connection and load-connection ends of said ground conductor.

17. Transmission-line means according to claim 15, in which said pilot arm and therefore said d-c source is connected across opposed corners of a resistance-bridge circuit in which said ground conductor and said sensing means form operative component parts, said bridge circuit further including conjugate fixed-resistance arms one of which includes said other pilot conductor.

18. Transmission-line means having a source-connection end and a remote load-connection end and comprising a ground conductor, at least two pilot conductors and multiple power conductors; circuit-breaker means for said power conductors at the source-connection end; a d-c conducting connection of one of said pilot conductors to said ground conductor at the source-connection end; a d-c conducting connection of said one pilot conductor to said ground conductor at the load-connection end; an independent circuit comprising a pilot arm in which a d-c source is series-connected to the other of said pilot conductors, one end of said arm being connected to the corresponding end of said ground conductor, and means connecting the other ends of said other pilot arm and ground conductor; means including a d-c conducting connection to one of the connection ends of said one pilot conductor for sensing the d-c potential from end to end of said ground conductor; and circuit-breaker trip means operatively connected to said sensing means and responsive to trip said circuit-breaker means upon the sensing of a predetermined level of said d-c potential.

19. Transmission-line means according to claim 18, in which said circuit-breaker trip means includes a fail-safe relay having a hold-in element serially connected in said pilot arm and at the source-connection end thereof, normally closed interruption contacts in said circuit at the load-connection end, and means responsive to open said contacts upon the sensing of said predetermined level.

20. Transmission-line means having a source-connection end and a remote load-connection end and comprising multiple power conductors, a ground conductor and at least two pilot conductors; circuit-breaker means for said power conductors at the source-connection end; a d-c conducting connection of one of said pilot conductors to said ground conductor at the source-connection end; an independent circuit comprising a pilot arm in which a d-c source is series-connected to the other of said pilot conductors, one end of said arm being connected to the corresponding end of said ground conductor, and means connecting the other ends of said pilot arm and ground conductor; means in said pilot arm for establishing a predetermined d-c current level in said circuit; means at the remote end of said transmission-line means for sensing the d-c potential on the remote end of said one pilot conductor with respect to the remote end of said ground conductor; and circuit-breaker trip means operative upon detection by said last-defined means of a predetermined d-c voltage level.

21. Transmission-line means having a source-connection end and a remote load connection end and comprising multiple power conductors, a ground conductor and at least two pilot conductors, a conductive connection of said ground conductor and of both pilot conductors to each other at one end; and resistance-bridge elements connected to the other ends of said ground conductor an of said pilot conductors; said bridge elements comprising connected conjugate fixed-resistance members between opposed bridge-excitation points, a voltage source connecting one of said points to said other end of one of said pilot conductors, means connecting the other of said points to said other end of said other pilot conductor, whereby said one end of said ground conductor becomes effectively the second bridge-excitation point, a monitoring resistance selected for value substantially corresponding to the desired safety-limit value of said ground conductor and in substantially the same proportional relationship therewith as the values of said fixed-resistance members bear to each other, said monitoring resistance connecting the said other end of said ground conductor to said one point, thereby defining second conjugate members connected between said points, and voltage-responsive means interconnecting said conjugate arms at the respective member-to-member connections thereof.

22. Transmission-line means according to claim 21, in which said fixed-resistance members are selected for substantially equal value.

23. Transmission-line means according to claim 21, in which said fixed-resistance members are selected for values substantially greater than said safety-limit value.

24. Transmission-line means having a source-connection end and a remote load-connection end and comprising multiple power conductors, a ground conductor and at least two pilot conductors, said ground conductor and one of said pilot conductors being connected to each other at one of said ends, the other of said pilot conductors having a d-c conducting connection to said ground conductor at said one end; circuit-breaker means for said power conductors at the source-connection end; resistance-bridge elements connected to said ground and pilot conductors at the other of said ends, said bridge elements comprising connected conjugate fixed-resistance members between opposed bridge-excitation points, a voltage source connecting one of said points to said other end of said other pilot conductor, means connecting the other of said points to said other end of said one pilot conductor, whereby said one end of said ground conductor becomes effectively the second brige-excitation point, a monitoring resistance selected for value substantially corresponding to the desired safety-limit value of said ground conductor and in substantially the same proportional relationship therewith as the values of said fixed-resistance members bear to each other, said monitoring resistance connecting said other end of said ground conductor to said one point, thereby defining second conjugate members connected between said points, and voltage-responsive means interconnecting said conjugate arms at the respective member-to-member connections thereof; and circuit-breaker trip means operative upon detection by said last-defined means of a predetermined voltage level.

25. Transmission-line means according to claim 24, in which said fixed-resistance members are selected for substantially equal value, and in which said trip means is operative upon detection of a voltage level of polarity opposite to that which is detected when the ground-conductor resistance is observed to be less than that of said monitoring resistance.

26. Transmission-line means according to claim 24, in which said bridge elements and source are located at said remote end.

27. Transmission-line means according to claim 24, in which a system ground to earth is provided at said one end of said ground conductor and in which said other end includes a local-grounding frame member, and means including normally closed contacts at said other end and connecting the corresponding end of said ground conductor to said frame member, the ground-conductor connection of said bridge elements at said other end being made to said frame member, whereby upon opening said contacts said voltage-responsive means and said monitoring resistance may serve to measure then-existing earth resistance to the system ground via such path or paths as may exist between said frame member and the local electrical relation thereof to earth.

28. Transmission-line means having a source-connection end and remote load-connection end and comprising multiple power conductors, a ground conductor and at least two pilot conductors; both of said pilot conductors being connected to said ground conductor at one of said ends; circuit-breaker means for said power conductors at the source-connection end; resistance-bridge elements connected to said ground and pilot conductors at said other end, said bridge elements comprising connected conjugate fixed-resistance members between opposed bridge-excitation points, a d-c voltage source connecting one of said points to said other end of one pilot conductor, means connecting the other of said points to said other end of said other pilot conductor, whereby said one end of said ground conductor becomes effectively the second bridge-excitation point, a monitoring resistance selected for value substantially corresponding to the desired safety-limit value of said ground conductor and in substantially the same proportional relationship therewith as the values of said fixed-resistance member bear to each other, said monitoring resistance connecting said one end of said ground conductor to said one point, thereby defining second conjugate members connected between said points, and voltage-responsive means interconnecting said conjugate arms at the respective member-to-member connections thereof; and circuit-breaker trip means operative upon detection by said last-defined means of a predetermined voltage level.

29. Transmission-line means according to claim 28, in which said fixed-resistance members are selected for substantially equal value, and in which said trip means is operative upon detection of a voltage level of polarity opposite to that which is detected when the ground conductor resistance is observed to be less than that of said monitoring resistance.

30. Transmission-line means according to claim 28, in which said bridge elements and source are located at said source-connection end.

* * * * *